US012682093B2

(12) United States Patent
Edwards et al.

(10) Patent No.: US 12,682,093 B2
(45) Date of Patent: Jul. 14, 2026

(54) STORING AND RETRIEVING DATA BASED ON EXPERIENCE IN CATEGORIES ASSOCIATED WITH HISTORICAL INTERACTIONS

(71) Applicant: Capital One Services, LLC, McLean, VA (US)

(72) Inventors: Joshua Edwards, Philadelphia, PA (US); Michael Mossoba, Great Falls, VA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 734 days.

(21) Appl. No.: 18/049,126

(22) Filed: Oct. 24, 2022

(65) Prior Publication Data

US 2024/0135017 A1    Apr. 25, 2024
US 2024/0232406 A9    Jul. 11, 2024

(51) Int. Cl.
*G06F 21/62*      (2013.01)

(52) U.S. Cl.
CPC ................................ *G06F 21/6218* (2013.01)

(58) Field of Classification Search
CPC ................................................. G06F 21/6218

USPC .......................................................... 726/26
See application file for complete search history.

(56) References Cited

U.S. PATENT DOCUMENTS

2021/0117055 A1*   4/2021   Sarin ...................... G06N 20/00
2021/0233182 A1*   7/2021   Laik ...................... G06F 16/957

* cited by examiner

*Primary Examiner* — Nasser M Goodarzi
(74) *Attorney, Agent, or Firm* — Harrity & Harrity, LLP

(57) ABSTRACT

In some implementations, a system may receive interaction data corresponding to an interaction associated with a particular user of a plurality of users. The system may determine, based on the interaction data, one or more interaction categories associated with the interaction. The system may store the interaction data as historical interaction data associated with historical interactions of the particular user. The system may determine, based on the historical interaction data, experience statuses associated with the particular user in at least a subset of the plurality of categories. The system may receive, from a user device of the particular user, review data indicating a review associated with a historical interaction of the particular user. The system may store the review as historical review data. The review may be associated with one or more experience statuses of the particular user in the one or more interaction categories associated with the historical interaction.

20 Claims, 10 Drawing Sheets

100

User ID: User 1

| Interaction | Interaction Party | Date | Time | Amount | Location |
|---|---|---|---|---|---|
| 1 | IP1 | 2021-1-3 | 3:00 PM | $100.00 | 12345 |
| ... | ... | ... | ... | ... | ... |
| n | IPn | 2021-6-27 | 12:00 PM | $60.00 | 23456 |

User Profile Database

110
Store interaction data

105
Receive interaction data

Review Management System

Interaction Data

Interaction Data

User Device

User 1

User 1

Interaction Party Device

100

100

| User ID: User 1 | |
|---|---|
| Interaction | Category(ies) |
| 1 | Food, Italian, Pizza, Wine |
| ... | ... |
| n | Clothing |

User Profile Database

Review Management System

115

Determine one or more categories associated with interaction

400

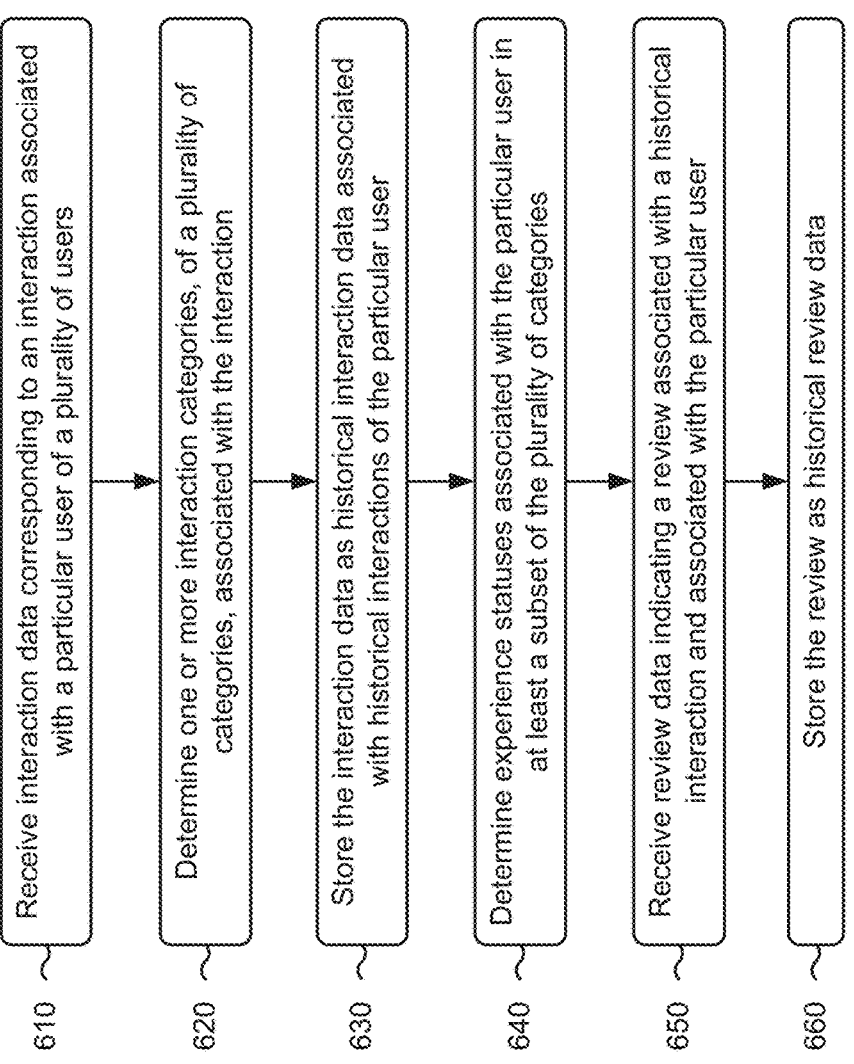

600

610   Receive interaction data corresponding to an interaction associated with a particular user of a plurality of users 620   Determine one or more interaction categories, of a plurality of categories, associated with the interaction 630   Store the interaction data as historical interaction data associated with historical interactions of the particular user 640   Determine experience statuses associated with the particular user in at least a subset of the plurality of categories 650   Receive review data indicating a review associated with a historical interaction and associated with the particular user 660   Store the review as historical review data

FIG. 6

STORING AND RETRIEVING DATA BASED ON EXPERIENCE IN CATEGORIES ASSOCIATED WITH HISTORICAL INTERACTIONS

BACKGROUND

Data storage, such as a database, a table, a linked list, and/or the like, is an organized collection of data. A relational database is a collection of schemas, tables, queries, reports, views, and/or the like. Data storage designers typically organize the data storage to model aspects of reality in a way that supports processes requiring information. A data storage management system is a software application that interacts with users, other applications, and data storage to allow definition, creation, querying, update, and/or administration of data storage.

SUMMARY

Some implementations described herein relate to a system for storing and retrieving data based on experience in categories associated with historical interactions. The system may include one or more memories and one or more processors communicatively coupled to the one or more memories. The one or more processors may be configured to receive, from a device, interaction data corresponding to an interaction associated with a first user of a plurality of users. The one or more processors may be configured to determine, based on the interaction data, one or more interaction categories, of a plurality of categories, associated with the interaction. The one or more processors may be configured to store the interaction data, with the one or more interaction categories, as historical interaction data associated with historical interactions of the first user. The one or more processors may be configured to provide the historical interaction data as input to a machine learning model, wherein the machine learning model may be trained using the historical interactions of the first user and historical interactions of other users of the plurality of users. The one or more processors may be configured to receive an output, based on applying the machine learning model to the historical interaction data, that indicates experience statuses associated with the first user in at least a subset of the plurality of categories. The one or more processors may be configured to receive, from a user device of the first user, review data indicating a review associated with a historical interaction, of the historical interactions of the first user, and associated with the first user. The one or more processors may be configured to store the review data as historical review data. The one or more processors may be configured to receive, from a user device of second user of the plurality of users, a search query. The one or more processors may be configured to identify, based on the search query and from the historical review data, one or more reviews corresponding to one or more users, of the plurality of users, that are associated with one or more experience statuses in one or more categories, of the plurality of categories and corresponding to the one or more search query categories, that indicate an expert status of the one or more users in the one or more categories. The one or more processors may be configured to transmit, to the user device of the second user, review data corresponding to the one or more reviews.

Some implementations described herein relate to a method of storing and retrieving data based on experience in categories associated with historical interactions. The method may include receiving, by a system having one or more processors and from a device, interaction data corresponding to an interaction associated with a particular user of a plurality of users. The method may include determining, by the system and based on the interaction data, one or more interaction categories, of a plurality of categories, associated with the interaction. The method may include storing, by the system, the interaction data, with the one or more interaction categories, as historical interaction data associated with historical interactions of the particular user. The method may include determining, by the system and based on the historical interaction data, experience statuses associated with the particular user in at least a subset of the plurality of categories. The method may include receiving, by the system and from a user device of the particular user, review data indicating a review associated with a historical interaction, of the historical interactions of the particular user, and associated with the particular user. The method may include storing, by the system, the review as historical review data, wherein the review may be associated with one or more experience statuses, of the experience statuses, associated with the particular user in the one or more interaction categories associated with the historical interaction.

Some implementations described herein relate to a non-transitory computer-readable medium that stores a set of instructions for a device. The set of instructions, when executed by one or more processors of the device, may cause the device to receive, from a user device associated with a user of a plurality of users, a search query. The set of instructions, when executed by one or more processors of the device, may cause the device to identify one or more search query categories, of a plurality of categories, associated with the search query. The set of instructions, when executed by one or more processors of the device, may cause the device to identify one or more reviews, from a plurality of reviews, associated with the one or more search query categories. The one or more reviews may correspond to one or more users, of the plurality of users, that are associated with one or more experience statuses in one or more categories, of the plurality of categories and corresponding to the one or more search query categories, that indicate an expert status of the one or more users in the one or more categories. The experience statuses may be based on historical interactions associated with the one or more users. The set of instructions, when executed by one or more processors of the device, may cause the device to transmit, to the user device, review data corresponding to the one or more reviews.

BRIEF DESCRIPTION OF THE DRAWINGS

FIG. 6 is a flowchart of an example process associated with storing and retrieving data based on experience in categories associated with historical interactions, in accordance with some embodiments of the present disclosure.

DETAILED DESCRIPTION

Figure 1A:
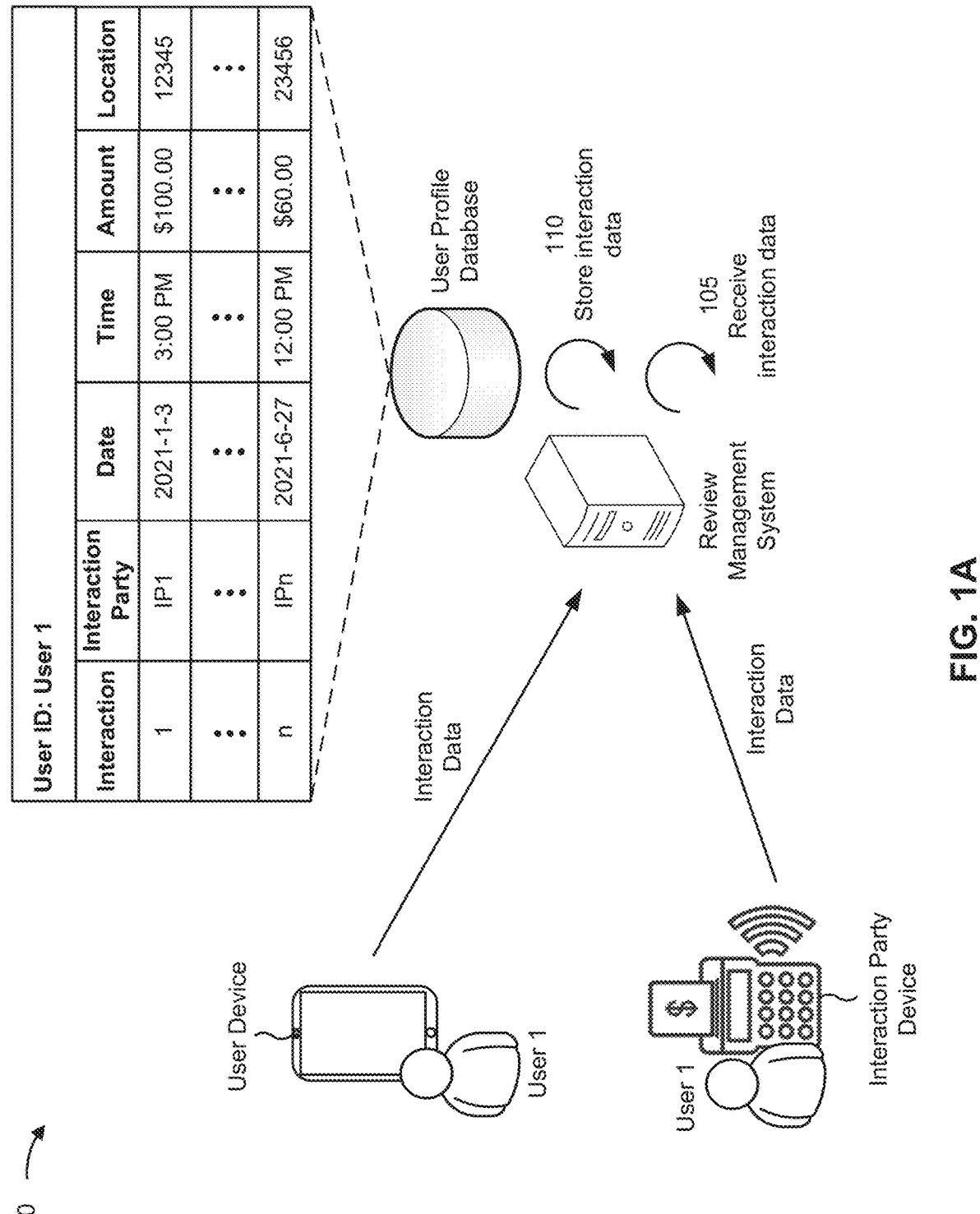
FIGS. 1A-1E are diagrams of an example associated with storing and retrieving data based on experience in categories associated with historical interactions, in accordance with some embodiments of the present disclosure.

The following detailed description of example implementations refers to the accompanying drawings. The same reference numbers in different drawings may identify the same or similar elements.

A user may perform an interaction (e.g., an exchange and/or a transaction) associated with an interaction party (e.g., a merchant, a vendor, and/or a service provider) and/or an interaction item (e.g., a product and/or a good). The interaction may occur in person, such as at a brick-and-mortar venue and/or a store of the interaction party, and/or remotely, such as in an online interaction. A review may be created (e.g., by the user) that includes information (e.g., text) that describes the interaction associated with the interaction party and/or the interaction item. The review may be provided for display, such as on a website associated with the interaction party and/or the interaction item. For example, the user may purchase a product from an online merchant (e.g., via a website associated with the online merchant) and write a review that describes the product and/or the purchase experience. The review may be posted on the website associated with the purchase and may be a source of information for other users who may be interested in the product and/or a similar product. In some cases, the user may be required to create a user profile associated with the website before being able to post the review on the website. In other cases, the user may not be required to perform any action before being able to post the review on the website. Because minimal requirements, if any, must be met to provide the review for display, irrelevant and/or inauthentic reviews are often provided for display. For example, irrelevant and/or inauthentic reviews associated with an interaction party and/or an interaction item may be written by individuals for compensation and/or may be written by text-generating artificial intelligence (AI) and/or machine learning techniques (e.g., to affect the interaction party and/or the interaction item positively or negatively). Accordingly, users (e.g., consumers) considering reviews to learn about an interaction party and/or an interaction item may be unable to trust (and/or rely on) the information associated with the reviews.

In some cases, a data analysis system may analyze a review to determine whether the review is relevant and/or authentic. For example, the data analysis system may perform optical character recognition (OCR) on the review (e.g., using a screenshot of the review from a website) to detect and extract the text of the review from the screenshot. The data analysis system may use machine learning text-analysis techniques to analyze the text of the review to determine whether the review is relevant and/or authentic. In some cases, the data analysis system may use parsing, sentiment analysis, word frequency analysis, collocation analysis, keyword extraction, and/or other text-analysis techniques to analyze the text of the review. In some cases, these text-analysis techniques cannot accurately and/or reliably determine whether the review is relevant and/or authentic. For example, these text-analysis techniques are often unable to differentiate between a human-written review and a machine-generated review and/or are unable to accurately and/or reliably extract concepts and/or meaning associated with the text. Further, because the text associated with reviews often includes a relatively low word count (e.g., less than 500 words), the text-analysis techniques often do not have enough data to properly analyze the text.

In some cases, if a reviewing user has a profile with a particular merchant, such as an online merchant, then the merchant (or a server of the merchant) may verify whether the reviewing user purchased a particular product. Reviews of a product by reviewing users who purchased the product may be ranked higher, and reviews of a product by reviewing users who did not purchase the product (or whose purchase could not be verified) may be ranked lower. However, this technique is more difficult for merchants that do not have user profiles, for brick-and-mortar businesses, and for purchases of a service (rather than a product). For example, it may be difficult to identify a particular item that was purchased at a brick-and-mortar store, to determine whether a particular user has expertise with a particular item, a particular service, or a particular category of item or service.

Some implementations described herein relate to a system that may organize and/or identify relevant and/or authentic reviews (e.g., prepared by users) based on experience statuses of the users with respect to one or more categories associated with the subject matter (e.g., interactions, interaction parties, and/or interaction items) associated with the reviews. The system may determine the experience statuses for a particular user based on that user's historical interactions in categories associated with the experience statuses. Subsequently, when the particular user prepares a review associated with a particular interaction of the historical interactions, the system may associate the review with one or more of that user's experience statuses in one or more categories that the system determines are associated with that interaction. The system may provide, to other users (e.g., to user devices of those users) reviews by users who have a certain level of experience (e.g., an expert status) with respect to the subject matter related to the reviews.

In this way, the system may be able to organize and/or identify reviews based on the interaction history of the reviewing users. In other words, the system may be able to verify that the reviewing user has actually performed the interaction associated with a review. As a result, the system may provide relevant and/or authentic reviews and/or recommendations to other users. Additionally, because only certain reviews may satisfy a certain condition (e.g., the reviewing user having an expert status in one or more categories), the system may only provide a subset of the reviews, thereby conserving computing and/or network resources of the system.

FIGS. 1A-1E are diagrams of an example 100 associated with storing and retrieving data based on experience in categories associated with historical interactions. As shown in FIGS. 1A-1E, example 100 includes a review management system, a user device, a user profile database, and a review database. These devices are described in more detail in connection with FIGS. 4 and 5.

As shown in FIG. 1A, a user (also referred to as a first user) may engage in an interaction (e.g., one or more exchanges, experiences, and/or transactions) with an interaction party (e.g., one or more individuals, one or more merchants, one or more vendors, and/or one or more service providers). For example, the first user may remotely perform, via the user device of the first user, the interaction with the interaction party, such as in an online interaction. As another example, the first user may perform, via an interaction party device (e.g., a point-of-sale (PoS) terminal and/or a kiosk) of the interaction party, the interaction with the interaction party, such as in an in-person interaction (e.g., at a brick-and-mortar store, a venue, and/or a movie theater).

As shown by reference number 105, the review management system may obtain interaction data corresponding to an interaction associated with the first user (e.g., performed by the first user). In some implementations, the review management system may obtain the interaction data associated with a particular interaction from a user device, an interaction party device, and/or another data source via a network. For example, in an interaction performed by the first user via the user device, the user device may provide, and the review management system may obtain, the interaction data associated with the interaction. As another example, in an interaction performed by the first user via an interaction party device, the interaction party device may provide, and the review management system may obtain, the interaction data from the interaction party device associated with the interaction and/or any intermediate device associated with the interaction. Additionally, or alternatively, another data source (e.g. an inventory system) and/or the intermediate device (e.g., a payment server) associated with the interaction may provide, and the review management system may obtain, the interaction data associated with the interaction.

In some implementations, the interaction data may include interaction-level data and/or item-level data associated with the interaction. For example, the interaction-level data may indicate the interaction party and/or an interaction party type associated with the interaction. In some implementations, the review management system may determine the interaction party type based on a type of good and/or a type of service that an associated interaction party provides. For example, the review management system may determine the interaction party type based on a classification system, such as the Standard Industrial Classification (SIC) system, the North American Industrial Classification System (NAICS), and/or the Merchant Category Code (MCC) classification system. An SIC system classification may be based on an overall largest product line and/or service line of the interaction party. An NAICS system classification may be based on a primary business activity that the interaction party performs. An MCC system classification may be based on a type of good and/or a type of service that the interaction party provides. For example, if the interaction party performs the retail sale of prepared food and drinks for on-premises or immediate consumption, the review management system may determine that the interaction party type associated with the interaction party is a restaurant.

In some implementations, the interaction-level data associated with the interaction may include an interaction identifier that identifies the interaction, and/or may indicate the interaction party (e.g., a merchant), a time (e.g., a date, a time of day, and/or a day of the week), an amount (e.g., a currency amount), a geographic region (e.g., a location associated with the merchant), a payment method, Level 1 interaction data (e.g., a card number, a date, a card verification value, a zip code, a merchant name, and/or an amount), and/or Level 2 interaction data (e.g., Level 1 data plus an indication of sales tax, a customer code, and/or a purchase identifier) associated with the interaction.

In some implementations, the interaction-level data associated with the interaction may be indicated in a variety of formats. For example, the amount may be indicated by using a currency amount (e.g., in U.S. Dollars and/or another currency), such as all items purchased plus sales tax. The merchant may be indicated by using a merchant name and/or a merchant identifier. The geographic region may be indicated by using an address (e.g., an address of the merchant), a location identifier associated with the merchant, a postal code, a country name and/or a country identifier, a state name and/or a state identifier, a province name and/or a province identifier, a region name and/or a region identifier, and/or a physical address, among other examples. For example, the geographic region may be a particular store location and/or a geographic area in which the store is located.

In some implementations, the item-level data may indicate an interaction item and/or an interaction item type associated with the interaction. For example, the review management system may determine the interaction item and/or the interaction item type based on a specific good and/or service that an associated interaction party provides. For example, if the interaction party performs the retail sale of a prepared food dish (e.g., a spaghetti dish), the review management system may determine that the interaction item associated with the interaction is the food dish and that the interaction item type is a type of food in the dish (e.g., spaghetti and/or Italian food).

In some implementations, the review management system may determine item-level data associated with the interaction. For example, the review management system may obtain the item-level data from a user device (and/or another data source) via a network. For example, the user device may obtain a data structure (e.g., an image and/or a file, among other examples) that encodes the item-level data associated with the interaction. The user device may apply OCR to the data structure to obtain a string (e.g., one or more strings of characters) and/or other machine-interpretable versions of information indicated by the item-level data. In some implementations, the review management system may obtain the data structure that encodes the item-level data associated with the interaction and may apply OCR to the data structure to obtain the string and/or other machine-interpretable versions of information indicated by the item-level data. For example, the user device may obtain an image of a receipt generated based on the interaction and may perform OCR on the receipt to identify the item-level data associated with the interaction.

In some implementations, the review management system may obtain the item-level associated with the interaction from another data source, such as an inventory management system (e.g., a radio-frequency identification (RFID)-based inventory system) and/or a data extraction system (e.g., a system that has access to historical interaction information associated with a user), among other examples. Additionally, or alternatively, the review management system may obtain the item-level data from the interaction party device, such as an interaction party device that obtains Level 3 interaction data (e.g., line-item data and/or or item-level data).

In some implementations, the review management system may obtain the item-level data from an augmented reality (AR) device (e.g., of the first user), such as a mobile device or a wearable communication device (e.g., a pair of smart eyeglasses, a head mounted display, or a virtual reality headset). The AR device may include one or more image capture devices (e.g., a camera, such as a video camera) configured to obtain one or more images of one or more objects in a field of view of the one or more image capture devices. The AR device may execute an application to capture images (e.g., video) and to provide an AR session in which AR content is overlaid on the captured images via a user interface of the AR device.

For example, in an interaction performed by the first user via the AR device, the AR device may provide, and the review management system may obtain, the item-level data associated with the interaction. For example, if the first user dines at a restaurant, the first user may use the AR device to obtain a set of images associated with the food and/or the drink purchased and/or consumed by the first user. The AR device may provide the set of images to the review management system. In some implementations, the AR device may provide, to the review management system, metadata identifying the particular food and/or the particular drink. Additionally, or alternatively, the review management system may identify the particular food and/or the particular drink using image recognition on the set of images. Thus, in some implementations, the AR device may obtain item-level data that would not otherwise be obtained via another mechanism (e.g., a receipt or transaction data). For example, if the first user receives a complimentary meal, the AR device may obtain item-level data associated with the interaction that would not show up on a receipt or in a transaction record.

For example, the item-level data may indicate one or more line items associated with an interaction and/or corresponding price(s) for those one or more line items. For example, a line item may identify a product, a product category, a good, a good category, a service, a service category, and/or a tax (e.g., a sales tax) along with a corresponding price (e.g., a cost or amount) for that line item. For example, a product may be identified by a product name, a category, a product identifier, and/or a stock keeping unit (SKU), among other examples.

In some implementations, the review management system may associate the interaction-level data and the item-level data in an interaction record. For example, the review management system may determine that the interaction-level data and the item-level data are associated with one another based on a match between interaction identifiers, interaction amounts, merchants, geographic regions, and/or times, among other examples. Additionally, or alternatively, the review management system may associate the item-level data and the interaction-level data using one or more rules. Thus, in some implementations, the interaction data may include interaction-level data (e.g., that may indicate the interaction party and/or the interaction party type associated with the interaction) and item-level data (e.g., that may indicate the interaction item and/or the interaction item type associated with the interaction).

As shown by reference number 110, the review management system may store (e.g., in a user profile database) the interaction data as historical interaction data associated with a historical interaction (e.g., one or more historical interactions of the first user). For example, the review management system may store the historical interaction data in an entry of a data structure (e.g., one or more entries of a data table stored in the user profile database). In some implementations, the user profile database may include user data, such as a unique identifier (e.g., a username of the first user) and/or a unique account identifier (e.g., an account ID number, a primary account number (PAN), and/or a virtual card number of a user account associated with the first user).

As shown in FIG. 1A, the review management system may store the historical interaction data associated with a first historical interaction (e.g., shown as being identified by the interaction identifier of "1") and a second historical interaction (e.g., shown as being identified by the interaction identifier of "n") associated with the first user (e.g., shown as being identified by the unique identifier of "User ID: User 1"). As further shown in FIG. 1A, the historical interaction data associated with the first historical interaction indicates the interaction party as "IP1," the date as "2021-1-3," the time as "3:00 PM," the amount as $100.00," and the location as "12345". The historical interaction data associated with the second historical interaction indicates the interaction party as "IPn," the date as "2021-6-27," the time as "12:00 PM," the amount as $60.00," and the location as "23456."

Figure 1B:
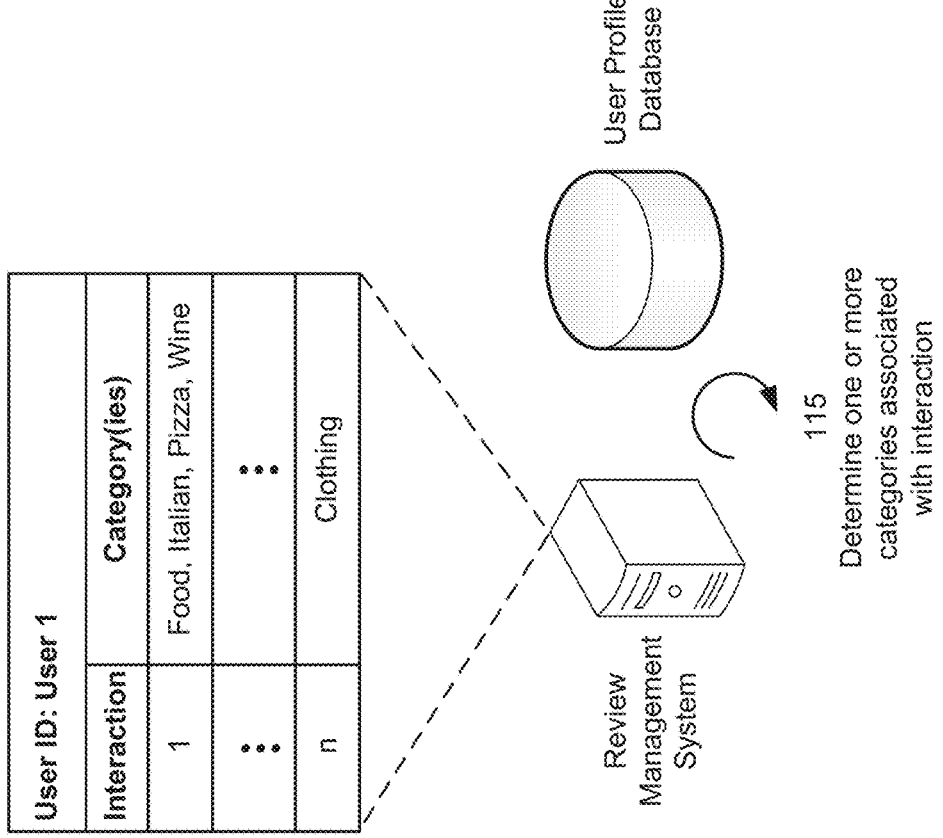

As shown in FIG. 1B, and by reference number 115, the review management system may determine an interaction category (e.g., one or more interaction categories) associated with the interaction. In some implementations, the review management system may determine the interaction category associated with the interaction based on the interaction data (e.g., an indication of the interaction party, the interaction party type, the interaction item, and/or the interaction item type, among other examples).

For example, if the first user purchases, via the user device of the first user, an electronic movie ticket for a particular movie from a movie theater website, the interaction data may indicate that the interaction party is the merchant associated with the movie theater website and/or the electronic movie ticket, may indicate that the interaction party type is a movie theater, may indicate that the interaction item is the electronic movie ticket for the particular movie, and/or may indicate that the interaction item type is the electronic movie ticket and/or movie ticket. Thus, for example, the review management system may determine, based on the interaction data, that the interaction categories associated with the interaction are a movie category, a movie ticket and/or electronic movie ticket category, and/or a particular movie category. In some implementations, the review management system may store the interaction category corresponding to the historical interaction stored in the user profile database (e.g., the historical interaction of the first user). In some implementations, the review management system may store the interaction category in the user profile database in connection with the historical interaction, such as in an entry associated with the historical interaction.

For example, as shown in FIG. 1B, the review management system stores multiple interaction categories associated with the first historical interaction (e.g., identified by the interaction identifier of "1") of the first user as "Food," "Italian," "Pizza," and "Wine." In this scenario, for example, the interaction categories may be based on interaction data associated with the first historical interaction that indicate that the interaction party is a merchant associated with an Italian restaurant, that the interaction party type is a restaurant and/or an Italian restaurant, and/or that the interaction items are pizza and wine. In this example, the review management system determines multiple interaction categories associated with a single historical interaction. In some implementations, the review management system may determine a single interaction category associated with a single historical interaction.

For example, as further shown in FIG. 1B, the review management system stores the interaction category associated with the second historical interaction (e.g., identified by the interaction identifier of "n") of the first user as "clothing." In this scenario, for example, the interaction category may be based on interaction data associated with the second historical interaction that may indicate that the interaction party is a merchant associated with a clothing merchant, that the interaction party type is a clothing retailer, and/or that the interaction item is a sweater and/or another clothing item.

Figure 1C:
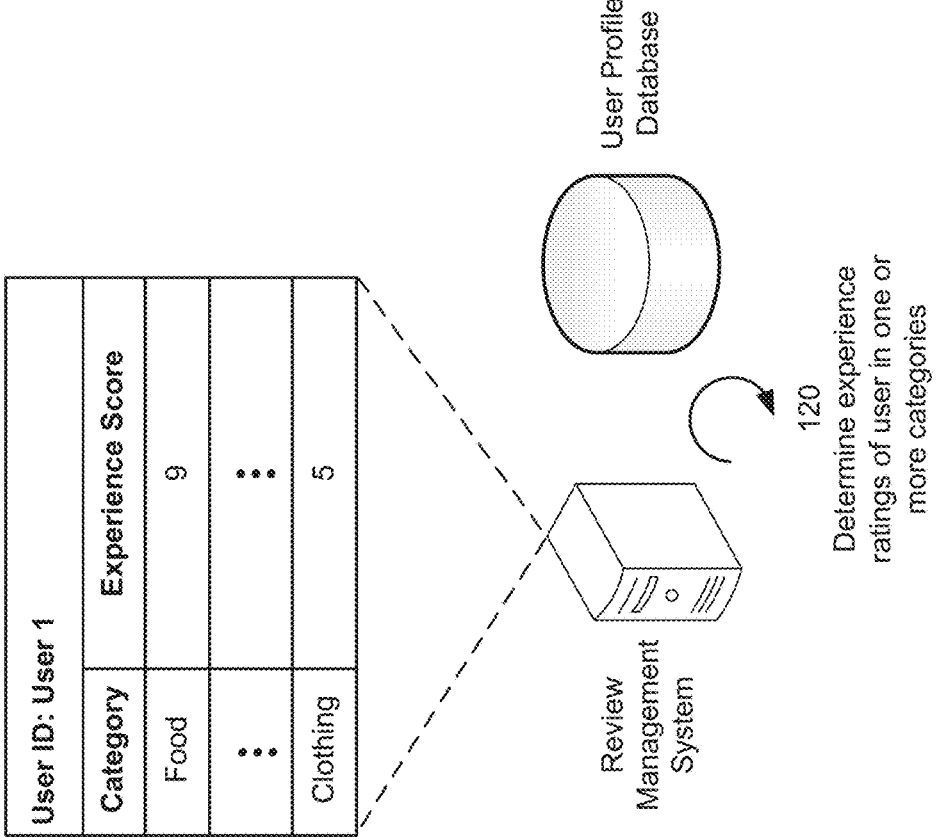

As shown in FIG. 1C, and by reference number 120, the review management system may determine an experience score (e.g., one or more experience scores) associated with the first user in a category (e.g., one or more categories). In some implementations, the experience score associated with the first user in the category may indicate an experience status of the first user in the category (e.g., a degree to which the first user is qualified to review items in the category). In some implementations, the category may be based on, and/or may include, the interaction category associated with the interaction of the first user. For example, if the interaction category associated with the interaction of the first user is "Food," the experience score associated with the first user may be in the category of "Food" and may indicate an experience status of the first user in the category of "Food."

In some implementations, the review management system may determine an experience status associated with the first user in a particular category based on an experience score associated with the first user in the particular category. For example, the experience status of a user may represent a degree to which the user is qualified to review items in the particular category (e.g., based on a familiarity with those items) and may be equivalent to or based on the experience score. As an example, a higher experience score may correspond to a high experience status. As another example, a first experience score above a threshold may correspond to a first experience status, a second experience score within a range may correspond to a second experience status, and/or a third experience score below a threshold may correspond to a third experience status, among other examples.

In some implementations, the review management system may determine the experience score based on a factor (e.g., one factor or a combination of factors) associated with the historical interaction data corresponding to the historical interaction associated with the particular category. For example, the factor may be a quantity of historical interactions associated with the particular category, a timestamp (e.g., one or more timestamps) corresponding to those historical interaction(s), a quantity of interaction items (e.g., historical interaction items) associated with the particular category, a granular relevance associated with the historical interactions associated with the particular category, and/or a point-of sale metric associated with the historical interactions associated with the particular category.

In some implementations, the review management system may determine the experience score based on the quantity of historical interactions associated with the particular category and/or a time period associated with the quantity of historical interactions associated with the particular category. For example, the time period may be a time period corresponding to a time period covering an entire historical interaction history of the user. For example, if a user (User A) is associated with a greater quantity of historical interactions over User A's entire transaction history relative to a quantity of historical interactions over an entire historical interaction history associated with a different user (User B), then the review management system may assign a higher experience score to User A relative to an experience score assigned to User B. In this way, the higher experience score may indicate that User A is more qualified to review items in the particular category than User B because User A is more familiar with the items than User B. This may enable User A to write a more relevant review than a review written by User B.

In some implementations, the time period may be a time period corresponding to a time period between a date and the current time, such as a time period of thirty days prior to the current time. For example, if User A is associated with a greater quantity of historical interactions over the thirty days prior to the current time relative to a quantity of historical interactions over the thirty days prior to the current time associated with User B, then the review management system may assign a higher experience score to User A relative to an experience score assigned to User B. In this way, the higher experience score may indicate that User A is more qualified to review items in the particular category than User B because User A is more familiar with the items over the designated time period than User B. This may enable User A to write a more relevant review than a review written by User B.

In some implementations, the review management system may determine a date, such as a latest interaction date and/or an average interaction date, based on the timestamp corresponding to the historical interaction. For example, the review management system may determine the experience score based on determining the date. The latest interaction date may indicate a most recent date, relative to the current time, that a user has performed the historical interaction (e.g., associated with the particular category). For example, if User A is associated with a latest interaction date that is thirty days prior to the current time, and if User B is associated with a latest interaction date that is sixty days prior to the current time, then the review management system may assign a higher experience score to User A relative to an experience score assigned to User B. In this way, the higher experience score may indicate that User A is more qualified to review items in the particular category than User B because User A has performed the historical interaction closer in time to the current time than a time that User B has performed the historical interaction, and thus is likely to have more relevant expertise.

The average interaction date may indicate an average date, relative to the current time, based on all historical interactions that match a particular category (or historical interactions within a time period that match the particular category). For example, if a historical interaction associated with a category has been performed thirty days prior to the current time, and if a different historical interaction associated with the category has been performed sixty days prior to the current time, then the review management system may determine that the average interaction date for historical interactions associated with the category is forty-five days prior to the current time. For example, if User A is associated with an average interaction date that is thirty days prior to the current time, and if User B is associated with an average interaction date that is sixty days prior to the current time, then the review management system may assign a higher experience score to User A relative to an experience score assigned to User B. In this way, the higher experience score may indicate that User A is more qualified to review items in the particular category than User B because User A has performed the historical interactions closer in time to the current time than User B, and thus is likely to have more relevant expertise.

In some implementations, the review management system may determine the experience score based on the quantity of interaction items associated with the particular category and/or a time period associated with the quantity of interaction items associated with the particular category. For example, the time period may be a time period corresponding to a time period covering an entire historical interaction history of the user. For example, if a user (User A) is associated with a greater quantity of historical interaction items associated with the category over User A's entire transaction history relative to a quantity of historical interaction items associated with the category over an entire historical interaction history associated with a different user (User B), then the review management system may assign a higher experience score to User A relative to an experience score assigned to User B. In this way, the higher experience score may indicate that User A is more qualified to review items (and thus has a greater expertise) in the particular category than User B because User A is more familiar with the items than User B.

In some implementations, the review management system may determine the experience score based on a granular relevance associated with the historical interactions associated with the particular category. The granular relevance may represent a degree to which the historical interactions are relevant to the particular category, such as a fine-grain relevance, a medium-grain granular relevance, or a coarse-grain granular relevance. For example, if the particular category associated with the historical interaction is a "Mexican restaurant," and if User A is associated with ten historical interactions at a Mexican restaurant, User B is associated with five historical interactions at restaurants other than a Mexican restaurant, and a different user (User C) is associated with zero historical interactions at any restaurant, then the review management system may determine that the granular relevance associated with User A is fine-grained, may determine that the granular relevance associated with User B is coarse-grained, and may determine that the granular relevance associated with user C is not applicable. Accordingly, as an example, the review management system may assign a higher experience score to User A relative to an experience score assigned to User B and may assign a higher score to User B relative to an experience score assigned to User C, which may be an experience score of zero. In this way, the higher experience score may indicate that User A is more qualified to review items in the particular category than User B because User A is associated with a finer granular relevance than User B.

As another example, if the particular categories are "taco" and "Mexican restaurant," and if User A is associated with 5 taco dishes (e.g., from the ten historical interactions at Mexican restaurants), and if another user (User D) is associated with ten historical interactions at Mexican restaurants and ten taco dishes, then the review management system may determine that the granular relevance associated with User D is finer than the granular relevance associated with User A. Accordingly, for example, the review management system may assign a higher experience score to User D relative to an experience score assigned to User A.

In some implementations, the review management system may determine the experience score based on the point-of-sale metric associated with the historical interactions associated with the particular category. For example, the point-of-sale metric may be associated with a point at which a sale is made in connection with the historical interaction, such as dining at a restaurant or ordering delivery from the restaurant (e.g., via a user device and/or a mobile application). As an example, if the particular categories associated with the historical interaction are "delivery" and "Italian restaurant," and if User A is associated with ten historical interactions ordering delivery from an Italian restaurant and User B is associated with five historical interactions dining at Italian restaurants, then the review management system determine that the point-of-sale metric associated with User A is higher relative to the point-of-sale metric associated with user B. Accordingly, for example, the review management system may assign a higher experience score to User A relative to an experience score assigned to User B. In this way, the higher experience score may indicate that User A is more qualified to review items in the particular category than User B because User A is associated with a higher point-of sale metric than User B.

In some implementations, the review management system may determine an expert status associated with the first user in the particular category based on the experience score. For example, the review management system may determine the expert status associated with the first user in the particular category based on the experience score exceeding a score threshold. For example, if the particular category is a "Food" category, the experience score associated with the first user in the "Food" category is 9, and the score threshold is 8, then the review management system may determine that the experience status associated with the first user in the "Food" category is an expert status (e.g., the expert status may indicate that the first user has an expert level of experience in the "Food" category).

In some implementations, the review management system may determine the experience score of the user based on associating weights with the different factors and may generate an overall experience score for the user based on associating the weights with the different factors. In some implementations, the review management system may associate different weights or the same weights with the different factors. As an example, if the particular categories associated with the historical interaction are "delivery" and "Italian restaurant," and if User A is associated with ten historical interactions dining at an Italian restaurant and User B is associated with five historical interactions ordering delivery from an Italian restaurant, then the review management system may determine the experience score by allotting a greater weight to the point-of-sale metric factor than the quantity of historical interactions factor. Accordingly, as an example, the review management system may assign a higher experience score to User B relative to an experience score assigned to User A. In this way, the higher experience score may indicate that User B is more qualified to review items in the particular category than User A because User B has experience ordering delivery from the Italian restaurant.

In some implementations, the review management system may determine the experience score associated with the first user in the category by providing the historical interaction data associated with the historical interaction of the first user as an input to a machine learning model. In some implementations, the machine learning model may be trained using the historical interaction data associated with the historical interaction of the first user and historical interactions of other users to determine an experience status associated with the first user in the category, as described in more detail in connection with FIG. 2 below and/or elsewhere herein. For example, the review management system may obtain an output that may indicate the experience status associated with the first user in the category based on applying the machine learning model to the historical interaction data of the first user and the historical interactions of other users.

In some implementations, the review management system may store (e.g., in the user profile database) the experience score associated with the first user in the associated category. For example, as shown in FIG. 1C, the review management system stores the experience score associated with the first user in the "Food" category as "9" and the experience score associated with the "Clothing" category as "5." In this scenario, for example, the first user has a higher experience status in the "Food" category than the "Clothing" category.

Figure 1D:
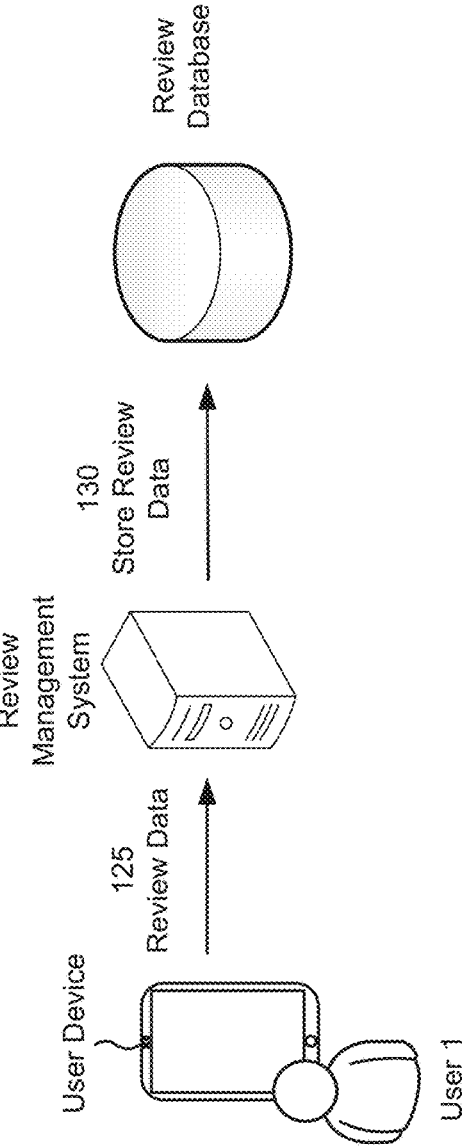

As shown in FIG. 1D, the first user may create (e.g., via the user device of the first user) a review associated with a particular historical interaction of the first user (e.g., a particular historical interaction in the first user's interaction history). For example, if the particular historical interaction of the first user is the first historical interaction (e.g., described above and identified by the interaction identifier of "1" in FIG. 1B), the first user may create a review that describes the first historical interaction. For example, the first user may create a review that describes the restaurant (e.g., the Italian restaurant), the food (e.g., the pizza), and/or the drink (e.g., the wine) associated with the first historical interaction. In some implementations, information based on the review associated with the particular historical interaction of the first user may be stored as review data by the first user (e.g., in a memory of a server device).

As shown by reference number 125, the review management system may obtain, from the user device, the review data. For example, the review management system may obtain the review data in response to a request to upload the review data to the review management system by the first user via the user device.

As shown by reference number 130, the review management system may store the review data as historical review data. In some implementations, the review management system may associate the review with the experience status associated with the first user in the interaction category associated with the particular historical interaction and may store the experience status as historical review data in the review database. For example, if the particular historical interaction is the first historical interaction, and if the review management system determines that the experience status associated with the first user in the "Food" category is an expert status, then the review management system may store information associated with the expert status of the first user in the "Food" category as the historical review data in the review database. In some implementations, information associated with a different review (e.g., one or more different reviews) based on a historical interaction of a different user (e.g., one or more historical interactions of one or more different users) may be stored as the historical review data in the review database. In some implementations, the review management system may associate the different review with the experience status of the different user in the interaction category associated with the historical interaction of the different user. Thus, in some implementations, the historical review data stored in the review database may include information associated with one or more reviews that correspond to one or more users and that are associated with one or more experience statuses in one or more categories.

In some implementations, the review management system may determine whether to remove the expert status from the first user. For example, the review management system may remove the expert status and/or may modify an experience score (or experience status) associated with the first user based on information that indicates one or more reviews associated with a particular category created by the first user includes incorrect information, inaccurate information, and/or information that is dissimilar to other reviews (e.g., by users having an expert status) associated with the particular category. In some implementations, the review management system may obtain an indication, from a user device of a user that outputs the one or more reviews created by the first user, that indicates the one or more reviews incorrect information, inaccurate information, and/or information that is dissimilar to other reviews associated with the particular category.

Figure 1E:
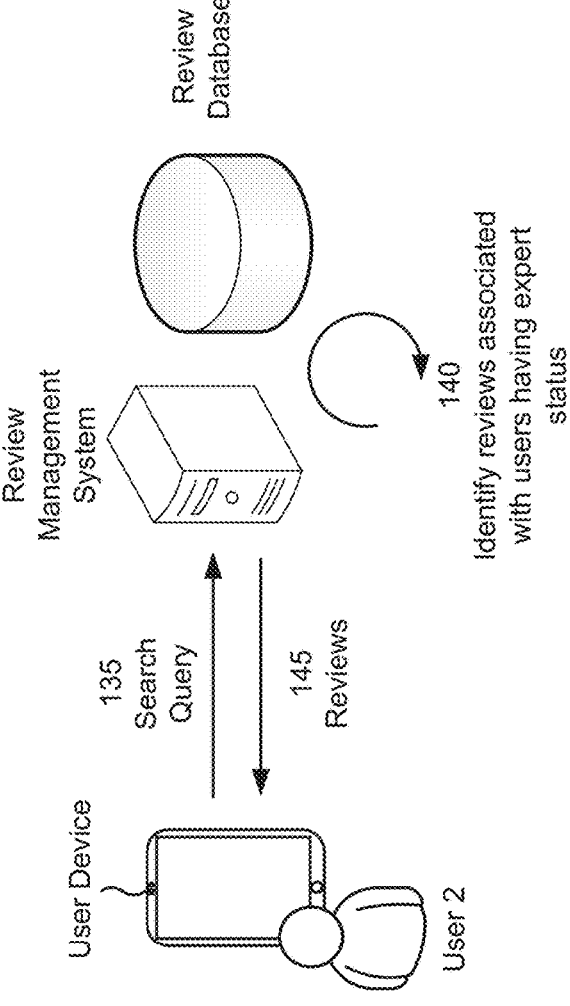

As shown in FIG. 1E, and by reference number 135, the review management system may obtain, from a user device of a second user, a search query associated with a search query category (e.g., one or more search query categories). In some implementations, the search query category may be based on the interaction category (described above) and/or the category associated with the experience status of the one or more users stored in the review database. For example, if second user desires to dine at a restaurant, the second user may provide, and the review management system may obtain, the search query associated with the search query category as "Food."

As shown by reference number 140, the review management system may identify, based on the search query and from the historical review data, a review (e.g., one or more reviews) corresponding to a user (e.g., one or more users) that may be associated with an experience status in the category corresponding to the search query category. In some implementations, the experience status in the category corresponding to the search query category may be an expert status of the user in the category corresponding to the search query category. For example, if the search query associated with the search query category is "Food," and if the historical review data includes a review corresponding to an identified user associated with an experience status in the category corresponding to the "Food" category, the review management system may identify the review corresponding to the identified user and/or other information associated with the review.

As shown by reference number 145, the review management system may provide, and the user device of the second user may obtain, review data corresponding to the review. For example, the review management system may provide the review data corresponding to the review in response to identifying the review corresponding to the identified user.

In this way, the system may be able to organize and/or provide reviews based on the interaction history of the reviewing users. In other words, the system may be able to verify that the reviewing user has actually performed the interaction associated with a review. As a result, the system may provide relevant and/or authentic reviews and/or recommendations to other users.

As indicated above, FIGS. 1A-1E are provided as an example. Other examples may differ from what is described with regard to FIGS. 1A-1E.

Figure 2:
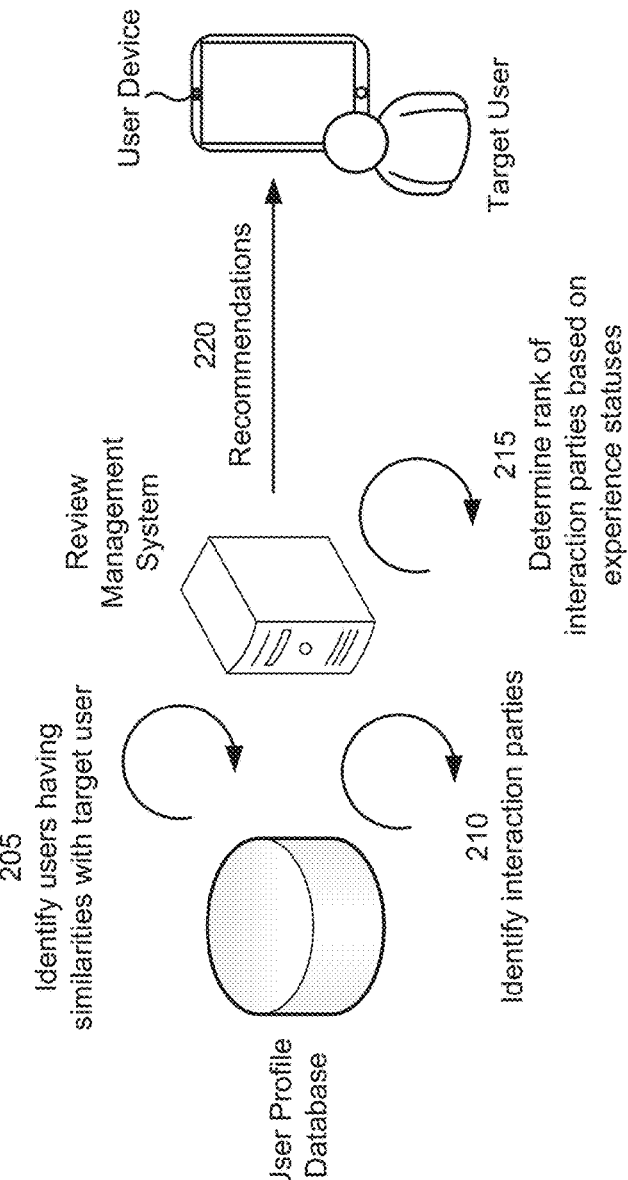
FIG. 2 is a diagram of another example associated with storing and retrieving data based on experience in categories associated with historical interactions, in accordance with some embodiments of the present disclosure.

FIG. 2 is a diagram of an example 200 associated with storing and retrieving data based on experience in categories associated with historical interactions. As shown in FIG. 2, example 200 includes a review management system, a user profile database, and a user device. These devices are described in more detail in connection with FIGS. 4 and 5.

As shown in FIG. 2, the review management system may provide recommendations of an interaction party and/or an interaction item to a user (also referred to as a target user). For example, as shown by reference number 205, the review management system may identify users (also referred to as reviewing users) having one or more similarities with the target user. For example, the review management system may identify a subset of the users identified in the review database having one or more similarities as the target user.

In some implementations, the one or more similarities to the target user may include a common geographic area. For example, the one or more similarities may be based on a geographic location associated with the target user (e.g., current geographic location or future geographic location). For example, a user of the subset of the users may be a local user that is local to the geographic location associated with the target user. For example, the local user may be located within a same geographic area as the geographic location associated with the target user, such as within a distance threshold (e.g., 5 miles, 10 miles, or 50 miles) of the geographic location and/or in a same zip code.

In some implementations, the one or more similarities to the target user may be based on similar demographic information. For example, a user of the subset of the users may include a similar sex, age, age range, and/or socioeconomic status as the target user. In some implementations, the one or more similarities may be based on a quantity of historical interactions of the target user and historical interactions of a user of the subset of the users that is associated with one or more common interaction categories that exceeds a quantity threshold. For example, if the quantity threshold associated with the one or more common interactions categories is 3, and if the quantity of historical interactions of the target user and historical interactions of the user of the subset of the users that is associated with the one or more common interaction categories is 4, then the user of the subset of the users has the one or more similarities as the target user.

In some implementations, the one or more similarities to the target user may be based on the user having the same experience status as the target user or the user and the target user having experience statuses based on experiences scores that are within a range of experience scores. For example, if a user of the subset of the users has an expert status, and if the target user has an expert status, then the user of the subset of the users has the one or more similarities as the target user.

As shown by reference number 210, the review management system may identify an interaction party and/or an interaction item. For example, the review management system may identify the interaction party and/or the interaction item associated with historical interactions of a user of the subset of the users. In some implementations, the interaction party and/or the interaction item may be associated with an interaction category.

As shown by reference number 215, the review management system may determine a rank of an interaction party and/or an interaction item based on an experience status of the reviewing user. For example, if the review management system identifies multiple interaction parties and/or multiple interaction items, the review management system may determine a rank of the multiple interaction parties and/or the multiple interaction items based on the experience status of the subset of the users in the interaction categories associated with the multiple interaction parties and/or the multiple interaction items. For example, if a first user of the subset of the users has a non-expert status in the interaction category and a second user of the subset of the users has an expert status in the interaction category, then the interaction party and/or the interaction item associated with the second user of the subset of the users may be ranked higher than the interaction party associated with the first user of the subset of the users. In other words, the review management system may associate a weight with the interaction party and/or the interaction item based on an associated experience status. As an example, an interaction party and/or interaction item associated with an expert status may be allotted a greater weight than an interaction party and/or an interaction item associated with a non-expert status. In some implementations, the weight may be used to determine a ranking of interaction parties and/or interaction items (e.g., a ranking that dictates an order of search results).

As shown by reference number 220, the review management system may provide, to a user device of the target user, a recommendation (e.g., one or more recommendations). For example, the review management system may provide, to the user device of the target user, a list of recommendations that are ordered based on the rank.

In some implementations, the review management system may provide recommendations to the target user based on a similarity profile (e.g., one or more similarity profiles). As an example, to develop the similarity profile, the review management system may learn patterns from a set of observations (e.g., using machine learning, as described elsewhere herein), such as a set of historical interactions and/or interaction items associated with one or more categories, and may provide an output that indicates such patterns, such as by using clustering and/or association to identify related groups of historical interactions and/or interaction items within the set of observations. The review management system may identify users based on identifying the related groups of historical interactions and/or interaction items. For example, if a similarity profile indicates that User A and User B dine at a particular Italian restaurant multiple times in one month despite the Italian restaurant being geographically located a far distance from User A and User B (e.g., 30 miles), the review management system may determine that the Italian restaurant is a recommendation candidate. The review management system may recommend the Italian restaurant to the target user based on the target user desiring to dine at a restaurant. The review management system may also identify the experience statuses (e.g., expert statuses) of the users associated with the recommendation candidates, and may provide that information to the target user with the recommendation.

Thus, in some implementations, the review management system may determine that a historical interaction and/or an interaction item associated with the user of the subset of user is a recommendation candidate based on the similarity profile and may recommend the recommendation candidate to the target user.

In this way, the system may be able to organize and/or identify reviews based on the interaction history of the reviewing users. In other words, the system may be able to verify that the reviewing user has actually performed the interaction associated with a review. As a result, the system may provide relevant and/or authentic reviews and/or recommendations to other users. Additionally, because only certain reviews may satisfy a certain condition (e.g., the reviewing user having an expert status in one or more categories), the system may only provide a subset of the reviews, thereby conserving computing and/or network resources of the system.

As indicated above, FIG. 2 is provided as an example. Other examples may differ from what is described with regard to FIG. 2.

Figure 3:
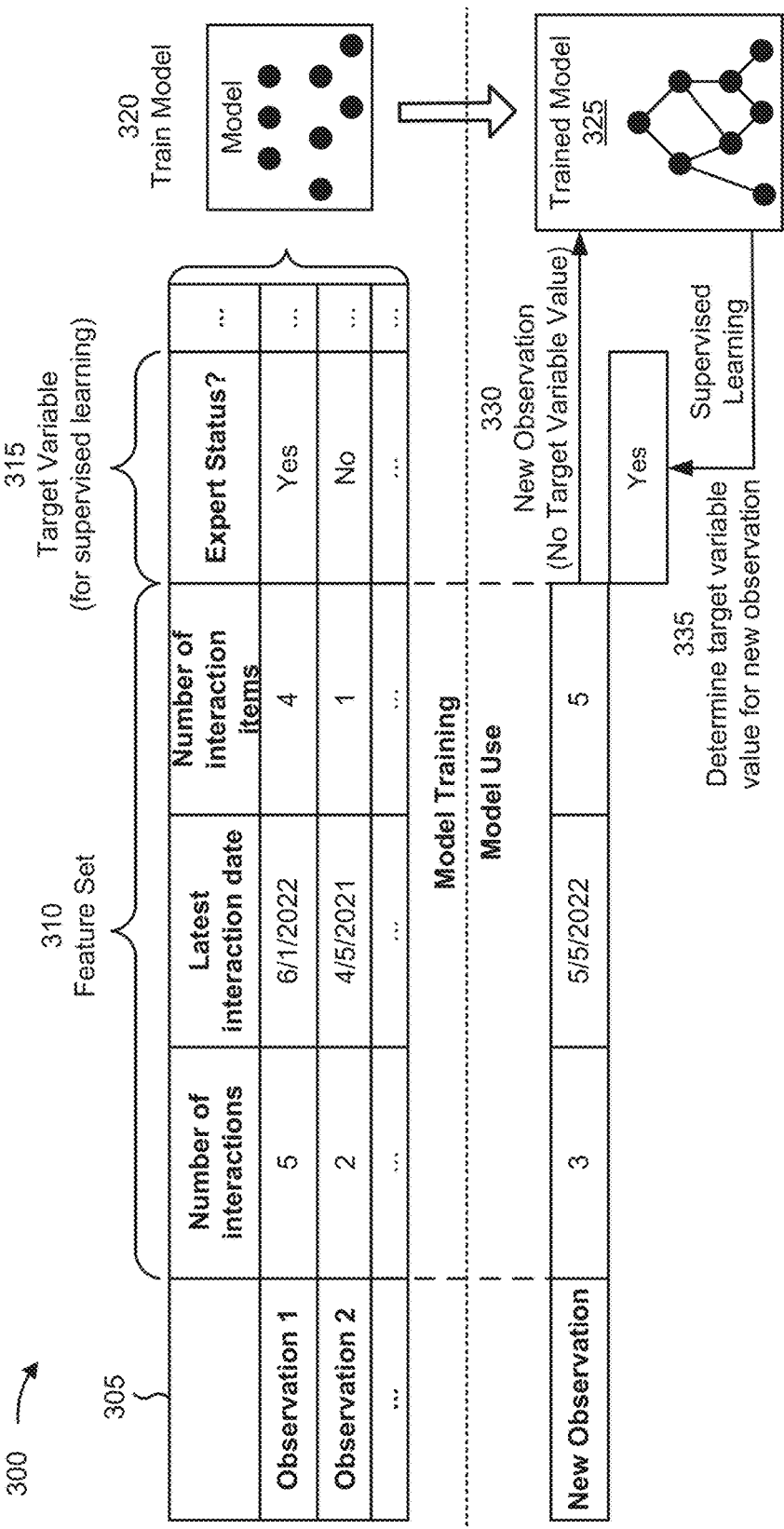
FIG. 3 is a diagram illustrating an example of training and using a machine learning model in connection with storing and retrieving data based on experience in categories associated with historical interactions, in accordance with some embodiments of the present disclosure.

FIG. 3 is a diagram illustrating an example 300 of training and using a machine learning model in connection with storing and retrieving data based on experience in categories associated with historical interactions. The machine learning model training and usage described herein may be performed using a machine learning system. The machine learning system may include or may be included in a computing device, a server, a cloud computing environment, or the like, such as the review management system described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from the review management system, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the review management system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of number of interactions, a second feature of latest interaction date, a third feature of number of interaction items, and so on. As shown, for a first observation, the first feature may have a value of 5, the second feature may have a value of Jun. 1, 2022, the third feature may have a value of 4, and so on. These features and feature values are provided as examples, and may differ in other examples. For example, the feature set may include one or more of the following features: a quality level associated with an interaction, relevancy of an interaction, and/or an integrity level associated with interaction.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is expert status, which has a value of Yes for the first observation.

The feature set and target variable described above are provided as examples, and other examples may differ from what is described above. For example, instead of the expert status, the target variable may be an experience status (e.g., expert, intermediate, or novice) or an experience score.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 325 to be used to analyze new observations.

As an example, the machine learning system may obtain training data for the set of observations based on historical interaction data of a particular user (e.g., the first user in example 100) and/or other users.

As shown by reference number 330, the machine learning system may apply the trained machine learning model 325 to a new observation, such as by receiving a new observation and inputting the new observation to the trained machine learning model 325. As shown, the new observation may include a first feature of number of interactions, having a value of 3, a second feature of latest interaction date, having a value of May 5, 2022, a third feature of number of interaction items, having a value of 5, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of Yes for the target variable of expert status for the new observation, as shown by reference number 335. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, the recommended interaction party and/or the recommended interaction item. The first automated action may include, for example providing the data identifying the recommended interaction party and/or the interaction item (e.g., as a search result or as part of calculating a review score).

As another example, if the machine learning system were to predict a value of No for the target variable of expert status, then the machine learning system may refrain from providing a recommendation associated with the interaction party and/or the interaction item (e.g., as a search result or as part of calculating a review score).

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like).

In some implementations, the trained machine learning model 325 may be re-trained using feedback information.

For example, feedback may be provided to the machine learning model. The feedback may be associated with actions performed based on the recommendations provided by the trained machine learning model 325 and/or automated actions performed, or caused, by the trained machine learning model 325. In other words, the recommendations and/or actions output by the trained machine learning model 325 may be used as inputs to re-train the machine learning model (e.g., a feedback loop may be used to train and/or update the machine learning model). For example, the feedback information may include an indication of whether or not the target user is interested in the particular recommended interaction party and/or interaction item (e.g., before participating in an interaction with the particular recommended interaction party) or if the target user had a positive experience with the particular recommended interaction party (e.g., after participating in the interaction with the particular recommended interaction party).

In this way, the machine learning system may apply a rigorous and automated process to recommend interaction parties and/or interaction items to a target user. The machine learning system enables recognition and/or identification of tens, hundreds, thousands, or millions of features and/or feature values for tens, hundreds, thousands, or millions of observations, thereby increasing accuracy and consistency and reducing delay associated with recommending interaction parties and/or interaction items relative to requiring computing resources to be allocated for tens, hundreds, or thousands of operators to manually recommend interaction parties and/or interaction items using the features or feature values.

As indicated above, FIG. 3 is provided as an example. Other examples may differ from what is described in connection with FIG. 3.

Figure 4:
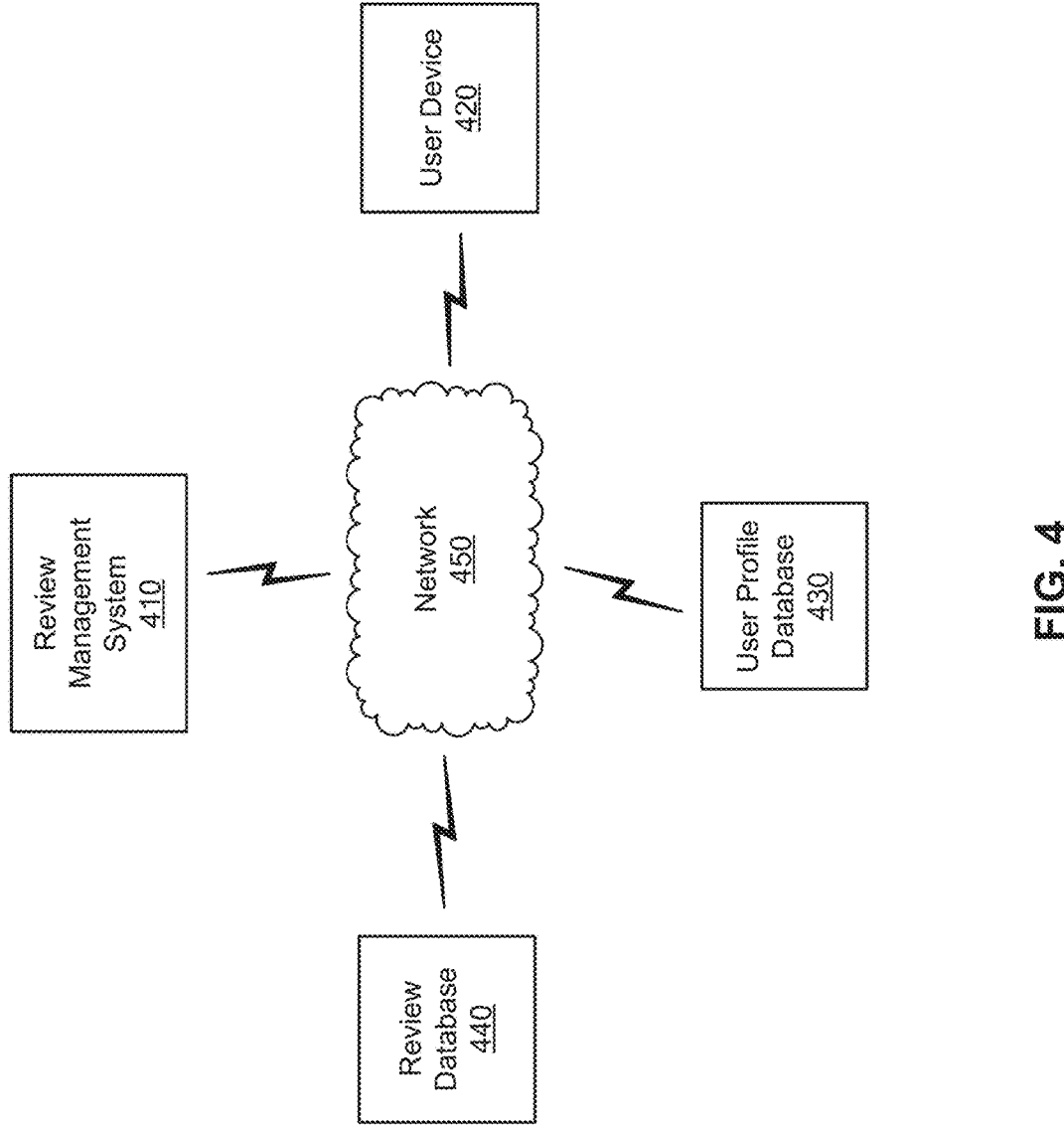
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a review management system 410, a user device 420, a user profile database 430, a review database 440, and a network 450. Devices of environment 400 may interconnect via wired connections, wireless connections, or a combination of wired and wireless connections.

The review management system 410 may include one or more devices capable of receiving, generating, storing, processing, providing, and/or routing information associated with storing and retrieving data based on experience in categories associated with historical interactions, as described elsewhere herein. The review management system 410 may include a communication device and/or a computing device. For example, the review management system 410 may include a server, such as an application server, a client server, a web server, a database server, a host server, a proxy server, a virtual server (e.g., executing on computing hardware), or a server in a cloud computing system. In some implementations, the review management system 410 includes computing hardware used in a cloud computing environment.

The user device 420 may include one or more devices capable of receiving, generating, storing, processing, and/or providing information associated with storing and retrieving data based on experience in categories associated with historical interactions, as described elsewhere herein. The user device 420 may include a communication device and/or a computing device. For example, the user device 420 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The user profile database 430 may include one or more devices capable of receiving, generating, storing, processing, and/or providing information associated with storing and retrieving data based on experience in categories associated with historical interactions, as described elsewhere herein. The user profile database 430 may include a communication device and/or a computing device. For example, the user profile database 430 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user profile database 430 may store historical interaction data corresponding to historical interactions associated with a particular user, and user data associated with the particular user (e.g., demographics and/or geographic location), as described elsewhere herein.

The review database 440 may include one or more devices capable of receiving, generating, storing, processing, and/or providing information associated with storing and retrieving data based on experience in categories associated with historical interactions, as described elsewhere herein. The review database 440 may include a communication device and/or a computing device. For example, the review database 440 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the review database 440 may store review data corresponding to reviews by one or more users, as described elsewhere herein.

The network 450 may include one or more wired and/or wireless networks. For example, the network 450 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 450 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
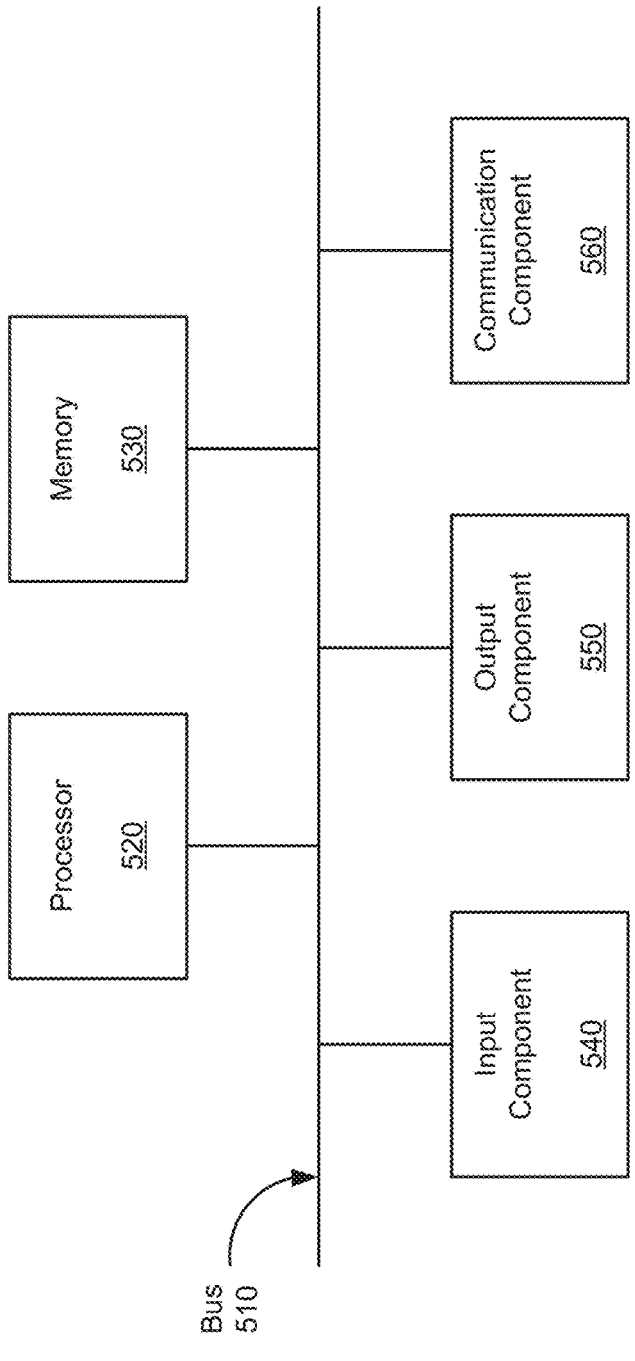
FIG. 5 is a diagram of example components of a device associated with storing and retrieving data based on experience in categories associated with historical interactions, in accordance with some embodiments of the present disclosure.

FIG. 5 is a diagram of example components of a device 500 associated with storing and retrieving data based on experience in categories associated with historical interactions. The device 500 may correspond to the review management system 410, the user device 420, the user profile database 430, and/or the review database 440. In some implementations, the review management system 410, the user device 420, the user profile database 430, and/or the review database 440 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with storing and retrieving data based on experience in categories associated with historical interactions. In some implementations, one or more process blocks of FIG. 6 may be performed by the review management system 410. In some implementations, one or more process blocks of FIG. 6 may be performed by one or more components of the device 500, such as processor 520, memory 530, input component 540, output component 550, and/or communication component 560.

As shown in FIG. 6, process 600 may include receiving, from a device, interaction data corresponding to an interaction associated with a particular user of a plurality of users (block 610). For example, the review management system 410 (e.g., using processor 520, memory 530, input component 540, and/or communication component 560) may receive, from a device, interaction data corresponding to an interaction associated with a particular user of a plurality of users, as described above in connection with reference number 105 of FIG. 1A. As an example, a user device of a user may provide, and the review management system may obtain, the interaction data associated with the interaction.

As further shown in FIG. 6, process 600 may include determining, based on the interaction data, one or more interaction categories, of a plurality of categories, associated with the interaction (block 620). For example, the review management system 410 (e.g., using processor 520 and/or memory 530) may determine, based on the interaction data, one or more interaction categories, of a plurality of categories, associated with the interaction, as described above in connection with reference number 115 of FIG. 1B. As an example, if the user purchases, via the user device, an electronic movie ticket for a particular movie from a movie theater website, the interaction data may indicate that the interaction party is the merchant associated with the movie theater website and/or the electronic movie ticket, the interaction party type may be movie theater, the interaction item may be the electronic movie ticket for the particular movie, and the interaction item type may be electronic movie ticket and/or movie ticket. Thus, for example, the review management system may determine, based on the interaction data, that the interaction categories associated with the interaction may be a movie category, a movie ticket and/or electronic movie ticket category, and/or a particular movie category.

As further shown in FIG. 6, process 600 may include storing the interaction data, with the one or more interaction categories, as historical interaction data associated with historical interactions of the particular user (block 630). For example, the review management system 410 (e.g., using processor 520 and/or memory 530) may store the interaction data, with the one or more interaction categories, as histori-
cal interaction data associated with historical interactions of
the particular user, as described elsewhere herein.

As further shown in FIG. 6, process 600 may include
determining, based on the historical interaction data, expe-
rience statuses associated with the particular user in at least
a subset of the plurality of categories (block 640). For
example, the review management system 410 (e.g., using
processor 520 and/or memory 530) may determine, based on
the historical interaction data, experience statuses associated
with the particular user in at least a subset of the plurality of
categories, as described above in connection with reference
number 120 of FIG. 1C. As an example, the review man-
agement system may determine an experience status asso-
ciated with the user in a particular category based on an
experience score associated with the user in the particular
category. For example, the experience score may be based
on a quantity of historical interactions of the user in the
particular category.

As further shown in FIG. 6, process 600 may include
receiving, from a user device of the particular user, review
data indicating a review associated with a historical inter-
action, of the historical interactions of the particular user,
and associated with the particular user (block 650). For
example, the review management system 410 (e.g., using
processor 520, memory 530, input component 540, and/or
communication component 560) may receive, from a user
device of the particular user, review data indicating a review
associated with a historical interaction, of the historical
interactions of the particular user, and associated with the
particular user, as described above in connection with ref-
erence number 125 of FIG. 1D. As an example, the review
management system may obtain the review data in response
to a request to upload the review data to the review man-
agement system by the first user via the user device.

As further shown in FIG. 6, process 600 may include
storing the review as historical review data, wherein the
review is associated with one or more experience statuses, of
the experience statuses, associated with the particular user in
the one or more interaction categories associated with the
historical interaction (block 660). For example, the review
management system 410 (e.g., using processor 520 and/or
memory 530) may store the review as historical review data,
wherein the review is associated with one or more experi-
ence statuses, of the experience statuses, associated with the
particular user in the one or more interaction categories
associated with the historical interaction, as described above
in connection with reference number 130 of FIG. 1D. For
example, if the particular historical interaction is the first
historical interaction, and if the review management system
determines that the experience status associated with the first
user in the "Food" category is an expert status, then the
review management system may store information associ-
ated with the expert status of the first user in the "Food"
category as the historical review data in the review database.

Although FIG. 6 shows example blocks of process 600, in
some implementations, process 600 may include additional
blocks, fewer blocks, different blocks, or differently
arranged blocks than those depicted in FIG. 6. Additionally,
or alternatively, two or more of the blocks of process 600
may be performed in parallel. The process 600 is an example
of one process that may be performed by one or more
devices described herein. These one or more devices may
perform one or more other processes based on operations
described herein, such as the operations described in con-
nection with FIGS. 1A-1E. Moreover, while the process 600
has been described in relation to the devices and components of the preceding figures, the process 600 can be performed
using alternative, additional, or fewer devices and/or com-
ponents. Thus, the process 600 is not limited to being
performed with the example devices, components, hard-
ware, and software explicitly enumerated in the preceding
figures.

The foregoing disclosure provides illustration and
description, but is not intended to be exhaustive or to limit
the implementations to the precise forms disclosed. Modi-
fications may be made in light of the above disclosure or
may be acquired from practice of the implementations.

As used herein, the term "component" is intended to be
broadly construed as hardware, firmware, or a combination
of hardware and software. It will be apparent that systems
and/or methods described herein may be implemented in
different forms of hardware, firmware, and/or a combination
of hardware and software. The hardware and/or software
code described herein for implementing aspects of the
disclosure should not be construed as limiting the scope of
the disclosure. Thus, the operation and behavior of the
systems and/or methods are described herein without refer-
ence to specific software code—it being understood that
software and hardware can be used to implement the sys-
tems and/or methods based on the description herein.

As used herein, satisfying a threshold may, depending on
the context, refer to a value being greater than the threshold,
greater than or equal to the threshold, less than the threshold,
less than or equal to the threshold, equal to the threshold, not
equal to the threshold, or the like.

Although particular combinations of features are recited
in the claims and/or disclosed in the specification, these
combinations are not intended to limit the disclosure of
various implementations. In fact, many of these features
may be combined in ways not specifically recited in the
claims and/or disclosed in the specification. Although each
dependent claim listed below may directly depend on only
one claim, the disclosure of various implementations
includes each dependent claim in combination with every
other claim in the claim set. As used herein, a phrase
referring to "at least one of" a list of items refers to any
combination and permutation of those items, including
single members. As an example, "at least one of: a, b, or c"
is intended to cover a, b, c, a-b, a-c, b-c, and a-b-c, as well
as any combination with multiple of the same item. As used
herein, the term "and/or" used to connect items in a list
refers to any combination and any permutation of those
items, including single members (e.g., an individual item in
the list). As an example, "a, b, and/or c" is intended to cover
a, b, c, a-b, a-c, b-c, and a-b-c.

No element, act, or instruction used herein should be
construed as critical or essential unless explicitly described
as such. Also, as used herein, the articles "a" and "an" are
intended to include one or more items, and may be used
interchangeably with "one or more." Further, as used herein,
the article "the" is intended to include one or more items
referenced in connection with the article "the" and may be
used interchangeably with "the one or more." Furthermore,
as used herein, the term "set" is intended to include one or
more items (e.g., related items, unrelated items, or a com-
bination of related and unrelated items), and may be used
interchangeably with "one or more." Where only one item is
intended, the phrase "only one" or similar language is used.
Also, as used herein, the terms "has," "have," "having," or
the like are intended to be open-ended terms. Further, the
phrase "based on" is intended to mean "based, at least in
part, on" unless explicitly stated otherwise. Also, as used
herein, the term "or" is intended to be inclusive when used in a series and may be used interchangeably with "and/or," unless explicitly stated otherwise (e.g., if used in combination with "either" or "only one of").

What is claimed is:

1. A system for storing and retrieving data based on experience in categories associated with historical interactions, the system comprising:

one or more memories; and one or more processors, communicatively coupled to the one or more memories, configured to:

receive, from a device, interaction data corresponding to an interaction associated with a first user of a plurality of users;

determine, based on the interaction data, one or more interaction categories, of a plurality of categories, associated with the interaction;

store the interaction data, with the one or more interaction categories, as historical interaction data associated with historical interactions of the first user;

provide the historical interaction data as input to a machine learning model, wherein the machine learning model is trained using the historical interactions of the first user and historical interactions of other users of the plurality of users;

receive an output, based on applying the machine learning model to the historical interaction data, that indicates experience statuses associated with the first user in at least a subset of the plurality of categories, wherein the experience statuses indicate a degree to which the first user is qualified to review items in at least the subset of the plurality of categories, and wherein the experience statuses include at least an expert status;

receive, from a user device of the first user, review data indicating a review associated with a historical interaction, of the historical interactions of the first user, and associated with the first user;

store the review data as historical review data, wherein the review is associated with one or more experience statuses, of the experience statuses, associated with the first user, in the one or more interaction categories associated with the historical interaction;

receive, from a user device of second user of the plurality of users, a search query, wherein the search query is associated with one or more search query categories of the plurality of categories;

identify, based on the search query and from the historical review data, one or more reviews corresponding to one or more users, of the plurality of users, that are associated with one or more experience statuses in one or more categories, of the plurality of categories and corresponding to the one or more search query categories, that indicate the expert status of the one or more users in the one or more categories; and transmit, to the user device of the second user, review data corresponding to the one or more reviews.

2. The system of claim 1, wherein one category, of the plurality of categories, includes an interaction party associated with a particular historical interaction of the historical interactions of the first user.

3. The system of claim 1, wherein one category, of the plurality of categories, includes an interaction party type associated with a particular historical interaction of the historical interactions of the first user.

4. The system of claim 1, wherein one category, of the plurality of categories, includes an interaction item associated with a particular historical interaction of the historical interactions of the first user.

5. The system of claim 1, wherein one category, of the plurality of categories, includes an interaction item type associated with a particular historical interaction of the historical interactions of the first user.

6. The system of claim 1, wherein the one or more processors, to identify the one or more reviews, are further configured to:

identify demographic information associated with the second user, wherein the one or more reviews correspond to one or more users, of the plurality of users, that are associated with similar demographic information as the demographic information associated with the second user.

7. The system of claim 1, wherein the one or more processors, to identify the one or more reviews, are further configured to:

identify a geographic location associated with the second user, wherein the one or more reviews correspond to one or more users, of the plurality of users, that are associated with geographic locations within a distance threshold of the geographic location associated have similar demographic information associated with the second user.

8. A method of storing and retrieving data based on experience in categories associated with historical interactions, comprising:

receiving, by a system having one or more processors and from a device, interaction data corresponding to an interaction associated with a particular user of a plurality of users;

determining, by the system and based on the interaction data, one or more interaction categories, of a plurality of categories, associated with the interaction;

storing, by the system, the interaction data, with the one or more interaction categories, as historical interaction data associated with historical interactions of the particular user;

determining, by the system and based on the historical interaction data, experience statuses associated with the particular user in at least a subset of the plurality of categories, wherein the experience statuses indicate a degree to which the particular user is qualified to review items in at least the subset of the plurality of categories, and wherein the experience statuses include at least an expert status;

receiving, by the system and from a user device of the particular user, review data indicating a review associated with a historical interaction, of the historical interactions of the particular user, and associated with the particular user; and storing, by the system, the review as historical review data, wherein the review is associated with one or more experience statuses, of the experience statuses, that indicate the expert status, associated with the particular user in the one or more interaction categories associated with the historical interaction.

9. The method of claim 8, further comprising:
identifying a subset of the plurality of users having one or
more similarities as a target user of the plurality of
users;
identifying a plurality of interaction parties associated
with historical interactions of the subset of the plurality
of users,
wherein the plurality of interaction parties are associ-
ated with one or more interaction categories of the
plurality of categories;
determining a rank of the plurality of interaction parties
based on experience statuses of the subset of the
plurality of users in the one or more interaction cat-
egories associated with the plurality of interaction
parties; and
transmitting, to a user device of the target user, a list of the
plurality of interaction parties,
wherein the list is ordered based on the rank.
10. The method of claim 9, wherein, for one user of the
subset of the plurality of users, the one or more similarities
includes a common geographic area.
11. The method of claim 9, wherein, for one user of the
subset of the plurality of users, the one or more similarities
includes similar demographic information.
12. The method of claim 9, wherein, for one user of the
subset of the plurality of users, the one or more similarities
includes a quantity of historical interactions of the target
user and historical interactions of the one user that are
associated with one or more common interaction categories,
of the plurality of categories, that exceeds a quantity thresh-
old.
13. The method of claim 9, wherein, for one user of the
subset of the plurality of users, the one or more similarities
includes similar experience statuses in one or more interac-
tion categories of the plurality of categories.
14. The method of claim 8, wherein determining an
experience status, of the experience statuses, in a particular
category of the at least a subset of the plurality of categories,
includes:
determining an experience score in the particular cat-
egory,
wherein the experience score is based, at least in part,
on one or more factors associated with the historical
interaction data corresponding to historical interac-
tions associated with the particular category, and
wherein an expert status corresponds to a particular
experience score exceeding a score threshold.
15. The method of claim 14, wherein the one or more
factors includes a quantity of the historical interactions
associated with the particular category.
16. The method of claim 14, wherein the one or more
factors includes timestamps corresponding to the historical
interactions associated with the particular category.
17. A non-transitory computer-readable medium storing a
set of instructions, the set of instructions comprising:
one or more instructions that, when executed by one or
more processors of a device, cause the device to:

receive, from a user device associated with a user of a
plurality of users, a search query;
identify one or more search query categories, of a
plurality of categories, associated with the search
query;
identify one or more reviews, from a plurality of
reviews, associated with the one or more search
query categories,
wherein the one or more reviews correspond to one
or more users, of the plurality of users, that are
associated with one or more experience statuses in
one or more categories, of the plurality of catego-
ries and corresponding to the one or more search
query categories, that indicate an expert status of
the one or more users in the one or more catego-
ries,
wherein the experience statuses indicate a degree to
which the plurality of users are qualified to review
items in at least the one or more categories,
wherein the experience statuses include at least the
expert status, and
wherein the experience statuses are based on histori-
cal interactions associated with the one or more
users; and
transmit, to the user device, review data corresponding
to the one or more reviews.
18. The non-transitory computer-readable medium of
claim 17, wherein the one or more instructions, that cause
the device to identify the one or more reviews, cause the
device to:
identify demographic information associated with the
user,
wherein the one or more reviews correspond to one or
more users, of the plurality of users, that are asso-
ciated with similar demographic information as the
demographic information associated with the user.
19. The non-transitory computer-readable medium of
claim 17, wherein the one or more instructions, that cause
the device to identify the one or more reviews, cause the
device to:
identify a geographic location associated with the user,
wherein the one or more reviews correspond to one or
more users, of the plurality of users, that are asso-
ciated with geographic locations within a distance
threshold of the geographic location associated have
similar demographic information associated with the
user.
20. The non-transitory computer-readable medium of
claim 17, wherein the one or more categories, of the plurality
of categories, include at least one of:
an interaction party,
an interaction party type,
an interaction item, or
an interaction item type.

* * * * *